United States Patent [19]

Davis et al.

[11] 4,236,106
[45] Nov. 25, 1980

[54] AUTOMATIC PULSE CONTROLLED SERVO CONTROL SYSTEM

[75] Inventors: Doxie M. Davis, Bainbridge Island; John B. Gehman, Poulsbo, both of Wash.

[73] Assignee: The United States of America as represented by the Secretary of the Navy, Washington, D.C.

[21] Appl. No.: 951,699

[22] Filed: Oct. 16, 1978

[51] Int. Cl.³ ............................................. G05B 11/28
[52] U.S. Cl. .................................... 318/599; 318/650; 318/678; 318/286; 318/17
[58] Field of Search ............... 318/599, 650, 678, 286, 318/17

[56] References Cited

U.S. PATENT DOCUMENTS

| | | | |
|---|---|---|---|
| 3,406,309 | 10/1968 | Martens | 318/650 X |
| 3,874,407 | 4/1975 | Griswold | 318/599 X |
| 3,882,367 | 5/1975 | Dulin | 318/599 |
| 3,997,826 | 12/1976 | Mayer | 318/286 |

*Primary Examiner*—B. Dobeck
*Attorney, Agent, or Firm*—R. S. Sciascia; Charles D. B. Curry

[57] ABSTRACT

A control system for the automatic adjustment of controlling elements. The system includes a pulse controlled servo follow-up circuit, a signal generating circuit, a sensing circuit, a system controller and a switching circuit. The system controller is either a special or small general purpose digital device which transmits a control signal to the switching circuit in response to the output of the sensing circuit. The switching circuit provides either of two variable time duration pulse control signals to the pulse-controlled follow-up circuit. One control signal will cause the follow-up circuit to provide a positive control and the other control signal will cause negative control. The amount of positive or negative control is determined by the time duration of the pulse. The signal generating device will be controlled by the output of the follow-up circuit and the sensing circuit will measure the condition of the signal generating circuit. The measured condition of the signal generating circuit, as measured by the sensing circuit, is transmitted to the system controller which will then provide another control signal to the switching circuit. The system has broad automatic servo control applications such as for machine controls and automatic circuit board testing.

1 Claim, 3 Drawing Figures

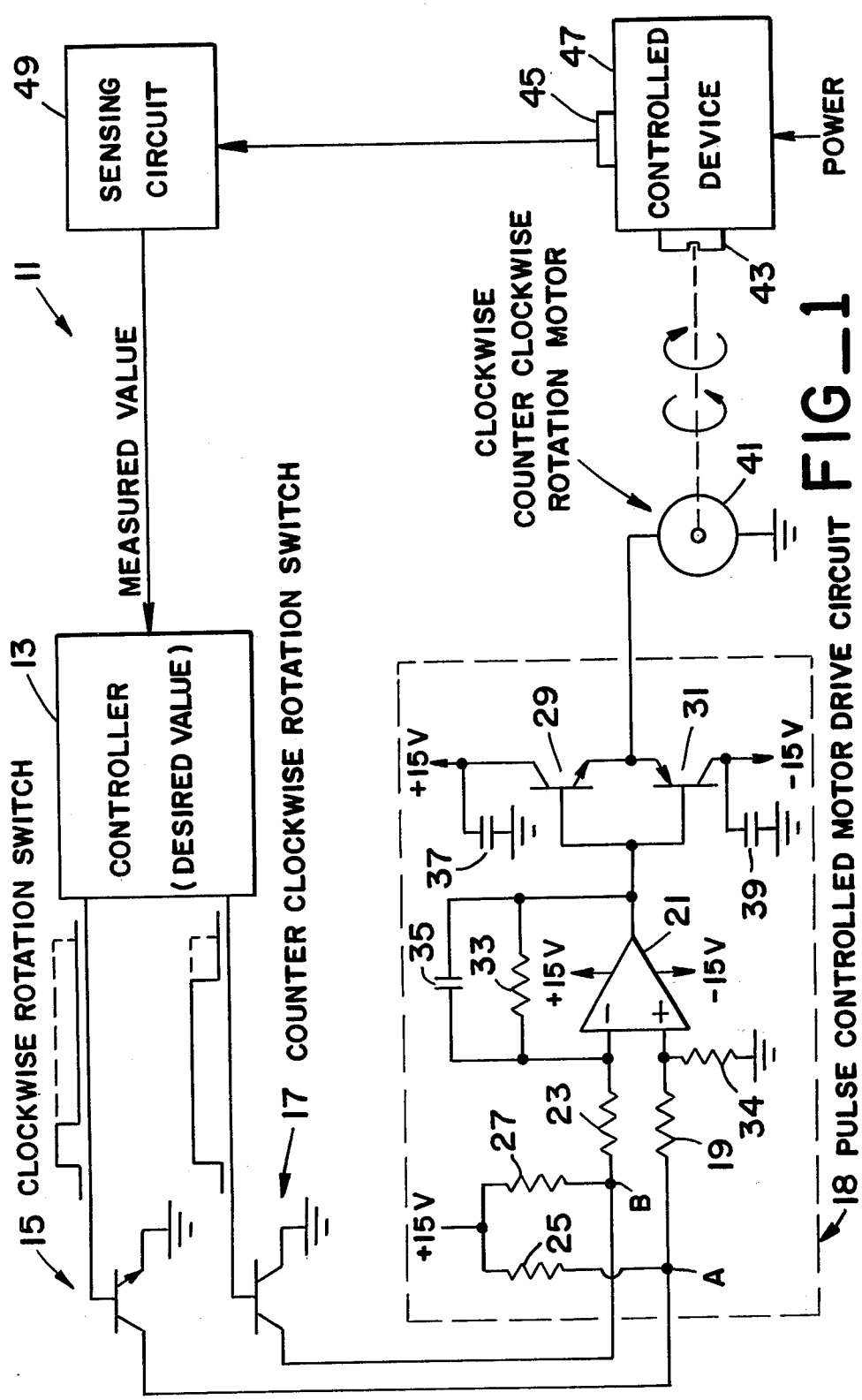

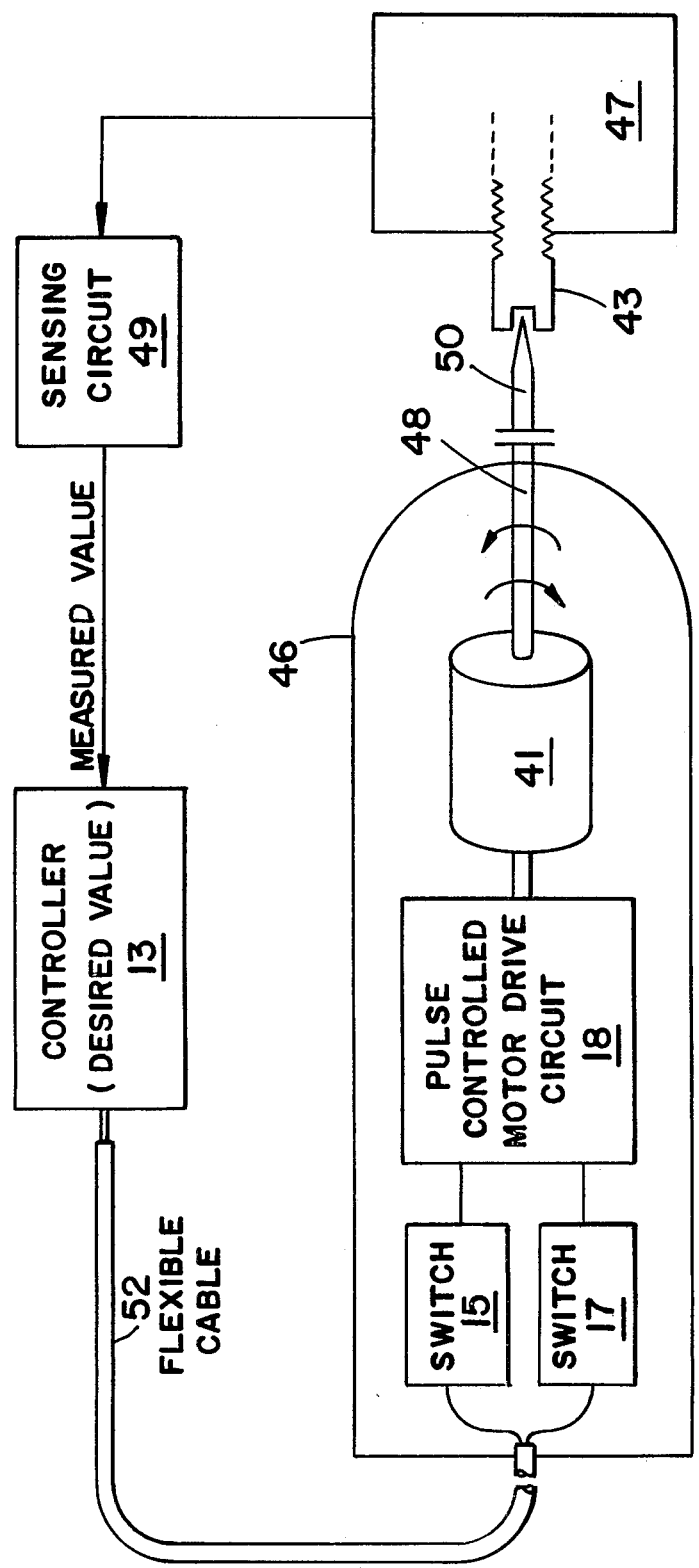
FIG_2

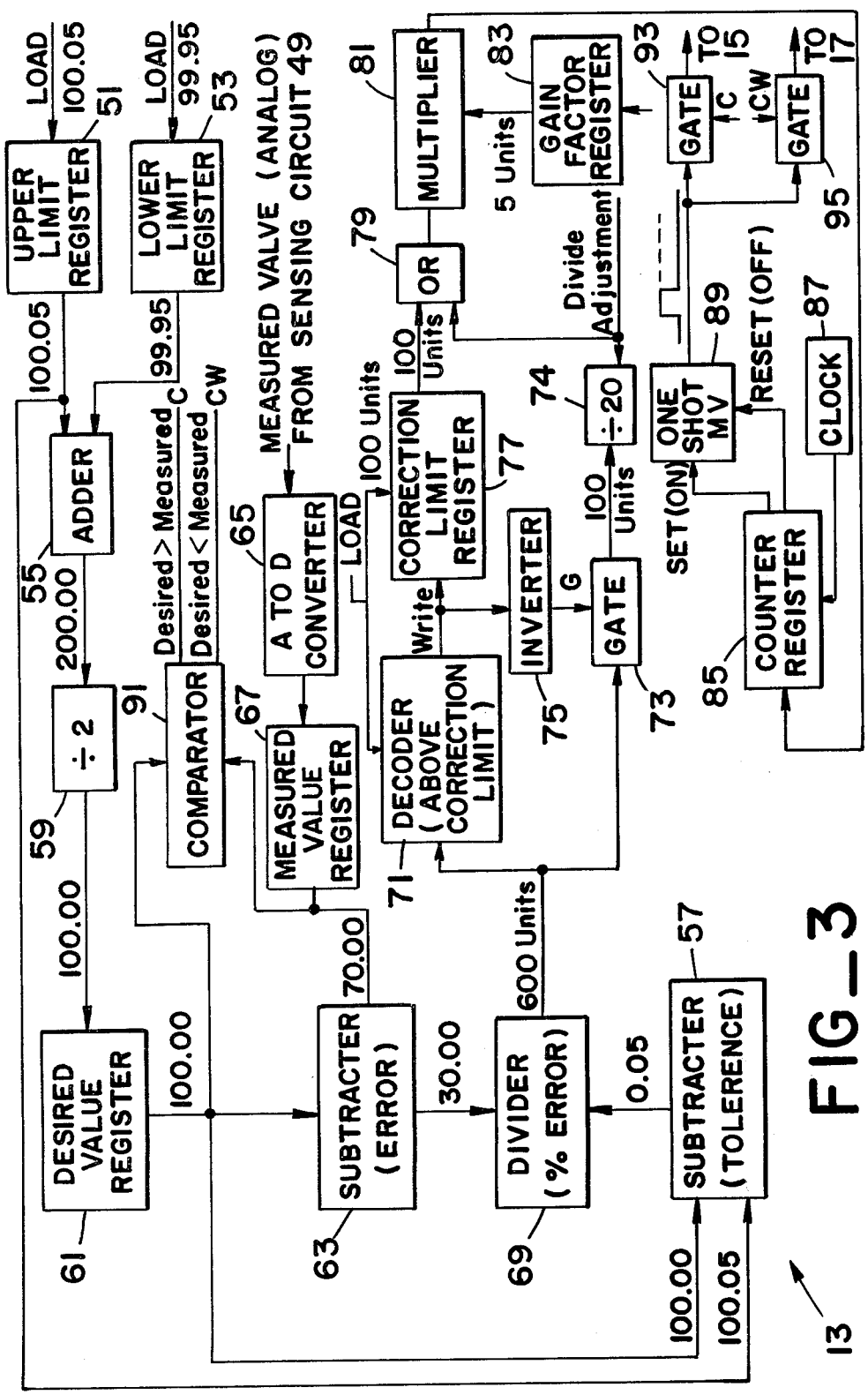
FIG_3

AUTOMATIC PULSE CONTROLLED SERVO CONTROL SYSTEM

BACKGROUND OF THE INVENTION

1. Field of the Invention

The present invention relates to a control system and more particularly to an automatic pulse controlled servo control system.

2. Description of Prior Art

In the field of automatic testing of electronic modules a significant problem exists in properly aligning the variable electronic components. The present practice is to use a hand held screw driver to adjust the screw heads of various adjustable elements. For example, the techician may manually adjust a potentiometer adjustment screw until a desired voltage is observed on a voltmeter. This is a slow process especially if the adjustable elements interact.

These problems are overcome by the present invention by providing for the automatic screw adjustment of variable electronic components by an automatic hand held control servo system.

SUMMARY OF THE INVENTION

Briefly, the present invention comprises a control system for the automatic adjustment of controlling elements. The system includes a pulse controlled servo follow-up circuit, a signal generating circuit, a sensing circuit, a system controller and a switching circuit. The system controller is either a special or small general purpose digital device which transmits a control signal to the switching circuit in response to the output of the sensing circuit. The switching circuit provides either of two variable time duration pulse control signals to the pulse-controlled follow-up circuit. One control signal will cause the follow-up circuit to provide a positive control and the other control signal will cause negative control. The amount of positive or negative control is determined by the time duration of the pulse. The signal generating device will be controlled by the output of the follow-up circuit and the sensing circuit will measure the condition of the signal generating circuit. The measured condition of the signal generating circuit, as measured by the sensing circuit, is transmitted to the system controller which will then provide another control signal to the switching circuit. The system has broad automatic servo control applications such as for machine controls and automatic circuit board testing.

STATEMENT OF THE OBJECTS OF THE INVENTION

An object of the present invention is to provide an automatic servo control system;

Another object of the present invention is to provide an automatic servo control system for adjusting variable electrical or electronic components in an automatic test system environment;

Still another object of the present invention is to provide an automatic pulse controlled servo system;

A further object of the present invention is to provide a hand held automatic servo control system for adjusting variable electrical components such as the screws on potentiometers during an automatic computer controlled test.

Other objects, advantages and novel features of the invention will become apparent from the following detailed description of the invention when considered in conjunction with the accompanying drawings wherein:

BRIEF DESCRIPTION OF THE DRAWINGS

FIG. 1 is a diagram of the automatic pulse controlled servo system of the present invention;

FIG. 2 is a schematic diagram of a hand held system using the invention shown in FIG. 1; and FIG. 3 is a block diagram of the controller used in the system of FIG. 1.

DESCRIPTION OF THE PREFERRED EMBODIMENT

In FIG. 1 is shown a diagram of the automatic pulse controlled servo system 11 of the present invention. The system includes a controller 13 the outputs of which are respectively applied to clockwise rotation transistor switch 15 and counterclockwise rotation transistor switch 17 for control of pulse controlled motor drive circuit 18. The output of switch 15 is connected through resistor 19 to the positive input of amplifier 21, which may be of the frequency compensated operational type. The output of switch 17 is connected through resistor 23 to the negative input of amplifier 21. The inputs of the amplifier are connected through current limiting resistors 25 and 27 to a $+15^v$ source to provide a positive pull-up voltage to both inputs of the amplifier. Therefore, when switch 17 is turned on point B is connected to ground and point A becomes positive with respect to B and therefore the operational amplifier has positive saturation which turns on transistor 29. Conversely, when switch 15 turns on, point A is connected to ground and point B becomes positive with respect to point A and therefore the operational amplifier has negative saturation which turns on transistor 31. Resistor 33 and capacitors 35, 37 and 39 function to minimize voltage spikes. When transistor 29 is turned on it causes reversible electric motor 41 to operate in one direction (clockwise) and when transistor 31 is turned on then the polarity is reversed which causes the motor to operate in the counterclockwise direction. The output shaft of motor 41 is connected to an adjustment element 43, such as a potentiometer, to vary the voltage at output 45 of the controlled device 47. For example, when 43 is rotated clockwise the voltage at output 45 will increase and when rotated counterclockwise the voltage will decrease. The voltage output is applied to a sensing circuit 49, which may be a programable digital voltmeter, the output of which (the measured value of device 47) is applied to the input of controller 13.

In operation the controller 13 will provide either a pulse to transistor 15 or a pulse to transistor 17 depending upon whether the measured value is above or below the desired value. Also, the pulse width will vary depending upon the magnitude of the differences between the measured value and the desired value. This operation will be hereinafter described in detail with respect to the controller 13 shown in FIG. 3.

Typical component values of pulse controller motor drive circuit 18 are as follows:

resistor 19—100K
amplifier 21—LM741 Operational
resistor 23—100K
resistor 25—10K
resistor 27—10K
transistor 29—2N1711
transistor 31—2N2905
resistor 33—100K capacitor 35—0.1 μf
capacitor 37—0.1 μf
capacitor 39—0.1 μf
motor 41—15VDC—reversible, gear reduction There are many uses of the automatic pulse controlled servo system 11 of the present invention. One such use is for the automatic adjustment of potentiometers in electronic circuits. When used in this manner the motor 41 and drive circuit 18 may be conveniently packaged in a hollow hand tool 46 as shown in FIG. 2 wherein the motor shaft 48 is connected to a small screw driver tool 50 that is brought into contact with the screw driver slot on the adjusment element 43 of the controlled device 47. The output of device 47 is connected to sensing circuit 49 the measured value output of which is applied to the input of controller 13. Controller 13 may be a general purpose digital computer which is also the controller for the automatic test system which is testing an electronic module. The adjustment is made by a subroutine which is called by the main program. Alternatively the controller 13 may be a special purpose computer as shown in FIG. 3. A flexible cable 52 connects the output of controller 13 to switches 15 and 17 which are also mounted in the hand tool. The system is very flexible because the computer is able to access any number of sensing circuits in the test system, such as a counter timer, digital multimeter, gain phase meter, digital test unit, or any other programmable instrument. It will automatically, quickly and very accurately adjust the adjustment element so that the measured value is within tolerance of the desired value. In addition it is easily installed, requiring only a five wire hookup, and the necessary software.

In FIG. 3 is shown a block diagram of the special purpose controller 13 used in servo system 11 of FIG. 1 of the present invention. The controller includes upper limit register 51 which, in this example, is illustrated as being loaded with a binary number representing the decimal system number 100.05. The controller also includes a lower limit register 53 which, in this example, is illustrated as being loaded with a binary number representing the decimal system number 99.95. The output of lower limit register is applied to one input of adder 55 and the output of upper limit register 51 is applied to the outer input of adder 55 and to one input of subtracter 57. The output of adder 55 is applied to the input of divide by two circuits (−2) 59 the output of which represents the desired value and is loaded into desired value register 61. The output of register 61 is applied to one input of subtracter 63 and to the other input of subtracter 57. The measured value, which may be the analog signal from sensing circuit 49 of FIG. 1, is applied to the input of analog to digital converter 65 the output of which is applied to the input of measured value register 67 the output of which is applied to the other input of subtracter 63. The output of subtracter 63, which provides the error signal, is applied to one input of divider 69. The output of subtracter 57, which provides the tolerance, is applied to the other input of divider 69. The output of divider 69, which provides the percentage of error, is applied to the input of decoder 71 and to gate 73. The output of decoder 71 is applied to the input of inverter 75 and to the input of correction limit register 77. Both decoder 71 and correction limit register are loaded with the correction limit which in this example is the binary number representing the decimal number 100 units. The output of inverter 75 is applied to the gate input (G) of gate 73. The output of register 77 is connected to one input of OR gate 79. The output of gate 73 is connected through divide circuit 74 to the other input of OR gate 79. From this it can be seen that the decoder 71 will detect when the output of divider 69 is 100 units or more and will then provide an output signal. This output signal is applied to the input of inverter 75 which provides no signal to the gate input of gate 73 and therefore gate 73 remains off. However, this output signal is also applied to the write input of register 77 which causes it to write the binary number representing the correction limit (100 units) through OR gate 79 to one input of multiplier 81. Therefore, when the output of divider 69 is greater than 100 units, then the input to multiplier 81 will always be 100 units. This is the course adjustment operation and the correction limit is important for system stability by preventing extreme overshoot on the first adjustment cycle. However, it should be particularly noted that when the output of divider 69 is less than 100 units (<100 units) then decoder 71 will provide no output and inverter 75 will provide a gate signal and turn gate 73 on. Therefore, the output of divider 69 will be applied through divide by 20 circuit 74 and through OR gate 79 to the input of multiplier 81. This is the fine adjustment operation and is important for precise adjustment of the controlled device.

Gain factor register 83 is loaded with a binary number representing the decimal gain factor (such as 5 units) which is applied to the other input of multiplier 81. The output of multiplier 81 is loaded into counter register 85. Clock 87 is applied to the clock input of register 85 and the initial count pulse is applied to the set input of one shot multivibrator 89 and the final count pulse (which occurs when the flip-flops of register 85 have been counted down to the clear state) is applied to the reset input of one shot multivibrator 89. Therefore, the pulse duration of multivibrator 89 will vary directly as a function of the magnitude of the binary number loaded into register 85.

It should be noted that the outputs of desired value register 61 and measured value register 67 are respectively applied to the inputs of comparator 91. Comparator 91 will provide an output signal C (clock-wise) when the desired value is greater than the measured value and an output signal CW (counterclockwise) when the desired value is less than the measured value. The C and CW signals are respectively applied to the gate inputs of gates 93 and 95 to which the output of multivibrator 89 is connected. Therefore, gate 93 will provide a signal to clockwise rotation switch 15 when clockwise rotation is required and gate 95 will provide a signal to counterclockwise rotation switch 17 when counterclockwise rotation is required.

It should be noted that different correction limits and gain factors may be used to adjust the system speed of operation and sensitivity to accomodate particular requirements. The system clocking is not shown or described since its implementation and operation will be obvious to those skilled in the art. However, with the example given the motor shaft will turn one revolution for each system clock cycle (approximately 1second) for the period when the percent error (output from divider 69) is greater than 100 units. When below 100 units then it will turn at much smaller increments (as determined by the divide adjustment of divide device 74) until within tolerence when the system will stop and the controlled device is properly adjusted.

What is claimed is:

1. A servo system comprising:
   (a) a controller having a desired value reference signal and first and second output control signals;
   (b) said first and second output control signals being operably connected to first and second switching elements;
   (c) a drive element for operating in either a first direction or in a second direction;
   (d) an element drive circuit responsive to said outputs of said first and second switching elements for controlling said drive element whereby said drive element is operated in said first direction when said first switch element is activated and operated in said second direction when said second switch element is activated;
   (e) a controlled device having a control element and an output whereby said output indicates a measured value and is responsive to said controlled element;
   (f) said drive element operably connected to said control element;
   (g) said output being operably connected to the input of said controller;
   (h) said first and second output control signals are variable in pulse length and the length of pulse determines the amount of movement of said drive element;
   (i) said controller includes correction limit means and percent error means;
   (j) means for comparing said percent error means to said corrective limit means; whereby
   (k) when said percent error is equal to or greater than said correction limit then said movement is a predetermined amount and when said percent error is less than said correction error than said movement is less than said predetermined movement and said controller provides said first output when said measured value is less than said desired value and said second output when said measured value is greater than said desired value for causing said measured value to about equal said desired value.

* * * * *